United States Patent [19]

Erhardt et al.

[11] Patent Number: 4,757,644

[45] Date of Patent: * Jul. 19, 1988

[54] METHOD AND APPARATUS FOR MANUFACTURING AND MACHINING GEARS

[75] Inventors: Manfred Erhardt, Puchheim; Herbert Loos, Dorfen-Stadt, both of Fed. Rep. of Germany

[73] Assignee: Carl Hurth Maschinen- und Zahnradfabrik GmbH & Co., Munich, Fed. Rep. of Germany

[*] Notice: The portion of the term of this patent subsequent to Sep. 1, 2004 has been disclaimed.

[21] Appl. No.: 14,144

[22] Filed: Feb. 12, 1987

Related U.S. Application Data

[63] Continuation of Ser. No. 673,802, Nov. 21, 1984, abandoned.

[30] Foreign Application Priority Data

Dec. 9, 1983 [DE] Fed. Rep. of Germany ....... 3344548

[51] Int. Cl.⁴ ................................. B24B 5/00
[52] U.S. Cl. .................... 51/105 GG; 51/287;
51/165.77; 219/69 V; 409/28; 409/30
[58] Field of Search ............ 51/26, 95 GH, 105 GG,
51/105 HB, 287, 165.77, 165.8, 94 R, 94 CS, 97
R; 204/129.46, 212, 224 M, 225; 219/69 M, 69
V; 409/25, 26, 27, 28, 29, 30

[56] References Cited

U.S. PATENT DOCUMENTS

| | | | |
|---|---|---|---|
| 1,989,651 | 1/1935 | Drummond | 51/26 X |
| 2,627,141 | 2/1953 | Praeg | 51/26 X |
| 3,897,661 | 8/1975 | Inatomi et al. | 51/105 HB X |
| 4,359,301 | 11/1982 | Spensberger et al. | 409/37 X |
| 4,689,918 | 9/1987 | Loos et al. | 51/105 GG |

FOREIGN PATENT DOCUMENTS

| | | | |
|---|---|---|---|
| 326083 | 12/1917 | Fed. Rep. of Germany | 51/26 |
| 1161465 | 1/1964 | Fed. Rep. of Germany | 51/287 |
| 1212390 | 3/1966 | Fed. Rep. of Germany | . |
| 1552747 | 1/1970 | Fed. Rep. of Germany | 51/105 G |
| 2658830 | 7/1978 | Fed. Rep. of Germany | 409/37 |
| 503952 | 4/1937 | United Kingdom | . |
| 15947 | 12/1941 | United Kingdom | . |

Primary Examiner—Robert P. Olszewski
Attorney, Agent, or Firm—Flynn, Thiel, Boutell & Tanis

[57] ABSTRACT

A method and apparatus are provided for manufacturing or machining a gear workpiece with a hyperboloidally, globoidally or similarly formed gearlike tool which has an abrasive or similar surface. The axes of the workpiece and tool are skew lines. During changing of the center distance, in particular as the workpiece and tool are moved apart at the end of the machining operation, the crossed-axes angle is automatically adjusted to conform to the effective rolling circle.

4 Claims, 2 Drawing Sheets

4,757,644

METHOD AND APPARATUS FOR MANUFACTURING AND MACHINING GEARS

This application is a continuation of U.S. Ser. No. 673,802, filed Nov. 21, 1984, now abandoned.

FIELD OF THE INVENTION

This invention relates to a method and apparatus for manufacturing or machining a gear and, more particularly, to a method and apparatus for machining the teeth of straight or helically, externally or internally toothed gears with a hyperboloidally or globoidally toothed tool which has an abrasive or similar surface, the axes of the tool and workpiece being skew lines with a center distance therebetween and one side of each tool tooth engaging the workpiece teeth free of backlash.

BACKGROUND OF THE INVENTION

An apparatus of this type has already been developed and actually works satisfactorily. However, it has been noticed that the machined tooth flanks have often grooves or the like, the cause for which was at first not understood. The inventors have found that the reason for this problem occurs during dressing of the tool. In particular, where diamond corns project out of the collective, then recesses are produced on the tool which in turn produce elevations on the workpiece surface. Similarly, where the abrasive surface of the tool has elevations produced by the collective, recesses are produced on the workpiece flank.

Therefore, a basic purpose of the invention was to overcome the described problem, or to mitigate it, and thus to improve the surface of the resulting workpieces.

SUMMARY OF THE INVENTION

This purpose is attained with a method and apparatus of the foregoing type in which the center distance between the workpiece and tool is changed during machining, and the cross-axes angle is simultaneously adjusted to correspond to the center distance and in view of the pitch angle of the workpiece teeth.

In a preferred form of the inventive apparatus, the workpiece and tool and also two guide wheels run with backlash, but the backlashes of the two wheel pairs are arranged so that the entire combination runs without backlash, namely, for example, when the left flank of a tool tooth engages teeth of the workpiece, then the right flank of teeth of the guide wheel on the tool spindle engages teeth of the other guide wheel.

In the sense of the invention, "abrasive surface" includes a chip-removing tool surface which does not having uniformly directed cutting edges. These include all tools with a granular working surface, for example grinding tools, and also tools for, for example, electrolytic, electro-erosive or electro-chemical machining.

BRIEF DESCRIPTION OF THE DRAWINGS

The invention will be discussed in detail in connection with FIGS. 1 and 2. In the drawings.

DETAILED DESCRIPTION

Figure 1:
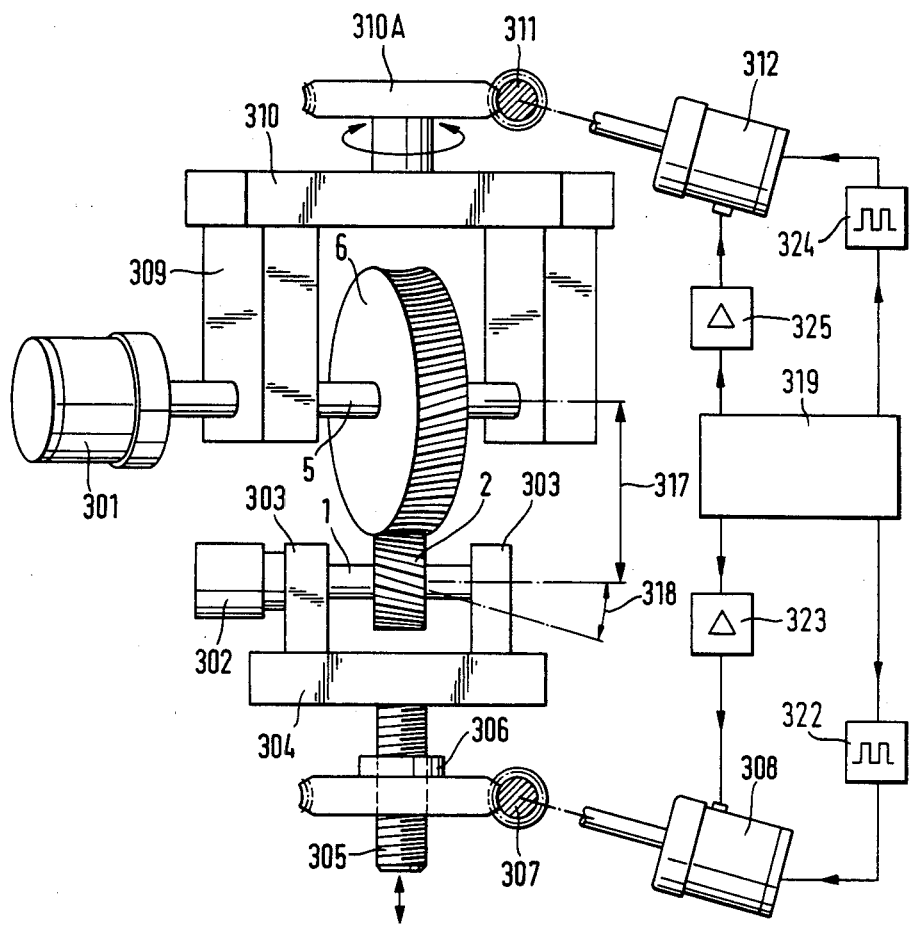
FIG. 1 is an elevational side view of an apparatus according to the invention, with which the method according to the invention can be carried out.

A workpiece spindle 1 exchangeably supports a workpiece 2 in the apparatus according to FIG. 1. A tool spindle 5 exchangeably supports a gearlike tool 6. The teeth of the tool mate, during machining, with the workpiece teeth. The axes of the workpiece spindle 1 and tool spindle 5 are skew lines, or in other words, are horizontal lines which intersect in a top view but are vertically spaced, which is expressed in FIGS. 1 and 2 by the workpiece being shown directly from the side and the tool being shown perspectively. The teeth of the tool are formed hyperboloidally or globoidally, so that the tooth flanks of the workpiece and tool, during machining, engage across the entire width of the workpiece teeth. For this reason, the tool is designed so that its teeth extend at least from one side surface of the workpiece to the other. In the example according to FIG. 1, the tool spindle 5 can be rotationally driven by a motor 301. The meshing teeth of the tool and workpiece rotationally drive the workpiece. In order that the teeth, during machining, are engaged only on one side, namely, a driving flank of each tool tooth engaging a driven flank of a workpiece tooth, the workpiece spindle 1 is provided with a brake 302. The tooth flanks being machined are changed by changing the direction of rotation of the drive.

The workpiece spindle 1 is rotatably supported by tailstocks 303 or the like on a workpiece carrier 304, which can be axially driven in a direction perpendicular to the spindles 1 and 5 by means of a feed spindle 305 thereon, a rotatable feed nut 306 which is fixed against vertical movement, a worm gear 307, and a feed motor 308 (downfeed). It is possible to provide other suitable feeding means. The usual and known machine parts such as guideways, bearings and the like are left out of the figure for clarity. The tool spindle 5 is rotatably supported by tailstocks 309 on a tool carrier 310. The tool carrier 310 is pivotally supported on a not-illustrated machine frame for movement about an axis which is perpendicular to the spindles 1 and 5. This swivelling movement is effected by a gear 310A on the tool carrier 310, a worm gear 311, and a swivel motor 312.

The downfeed of the workpiece carrier 304 is controlled by a CNC-control 319, which for this purpose is connected through an incremental transmitter 322 and an amplifier 323 to the feed motor 308. At the same time, the CNC-control 319 controls the adjustment of the cross-axes angle. For this purpose, it is connected through an incremental transmitter 324 and an amplifier 325 to the swivel motor 312. The downfeed and the adjustment of the cross-axes angle are controlled in dependence on one another, namely, the CNC-control 319 controls the motors 308 and 312 such that a specific unit of length along the downfeed path corresponds to a specific amount of angle adjustment. In place of the CNC-control, it is also possible to use an NC-control or an equivalent control.

If, through feeding or removing of the workpiece carrier 304, the center distance 317 is changed, then it is possible with the control arrangement which includes the parts 307, 308; 311, 312; 319,322 to 325 to adjust the pitch angle 318 of the workpiece teeth with respect to he tool to a value which is valid for each rolling or pitch circle diameter of the workpiece 2 and tool 6. This is possible during feeding, namely, when reducing the center distance 317, but is not particularly important there because of the progressing chip removal. However, important and significant for the invention is this adjusting during separating or removing, namely, during enlarging of the center distance 317. In particular, after machining the tooth system on the workpiece, if the workpiece and tool are separated from one another while machining continues, then the grooves which are to be avoided are machined off, namely, they are removed. However, if the angle between the cross axles 1 and 5 which is decisive for the finished workpiece were maintained as separation occurred, then the pitch angle which is decisive for the finished workpiece would be used with a rolling circle which is too large for it, and the pitch angle would become inexact or incorrect.

Figure 2:
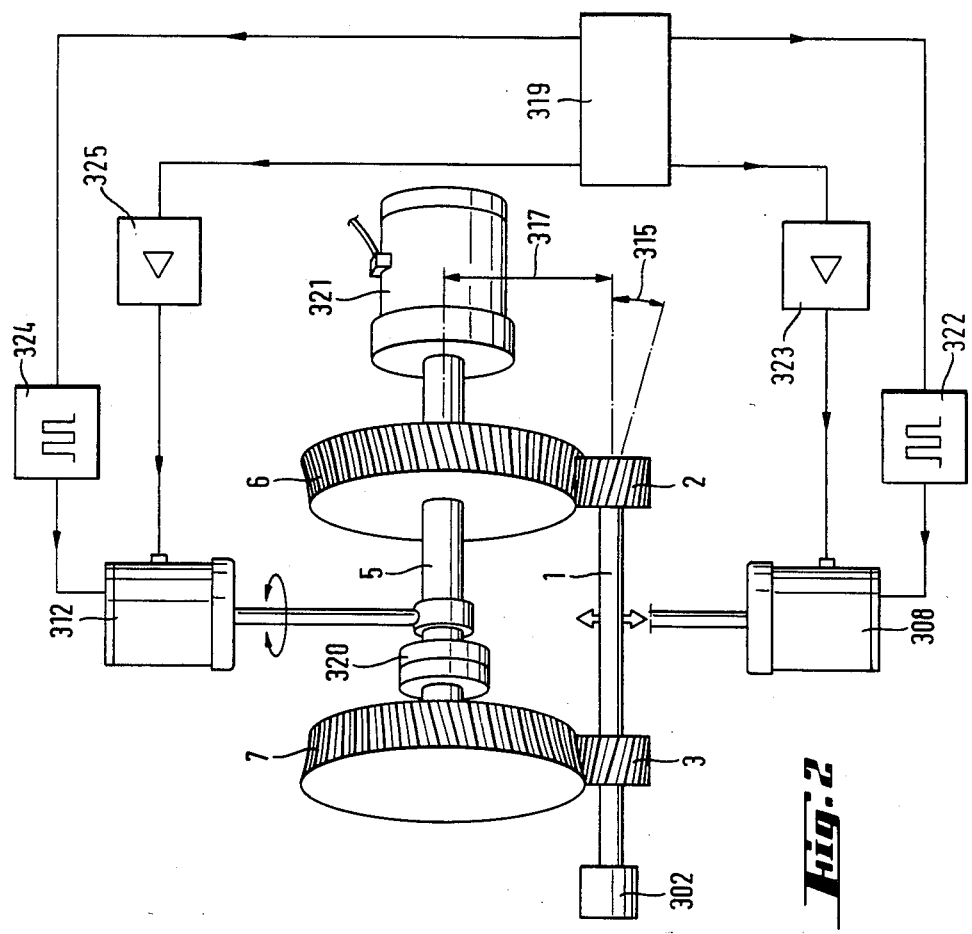
FIG. 2 is an elevational side view of an alternative embodiment of the apparatus according to FIG. 1.

The exemplary embodiment of FIG. 2 is illustrated more schematically than the preceding example. In particular, the feed mechanism and the swivelling mechanism are symbolized with arrows. The workpiece spindle is again identified with reference numeral 1, the workpiece with 2, the tool spindle with 5 and the tool with 6. The center distance 317 can again be changed by means of the feed motor 308. The crossed-axes angle can be changed as in the preceding example by a swivel motor 312. In order to be able to adjust the cross-axes angle and thus the pitch angle 318 with respect to the center distance 317, a CNC control 319, an incremental transmitter 322 and an amplifier 323 are provided as in the preceding example, also an incremental transmitter 324 and an amplifier 325.

A toothed guide wheel 3 is arranged on the workpiece spindle 1 and a toothed guide wheel 7 is arranged on the tool spindle 5. The wheels 3 and 7 mesh with one another, have the same translation or speed ratio as the workpiece and tool, and are adjusted to the position of the crossed-axes point or pivot point (which is defined by a line normal to and intersecting both axes), which can substantially be chosen. The tool spindle 5 can be interrupted by means of a shiftable coupling 320. The motor 321 for the rotary drive is arranged on the end of the tool spindle nearest the tool 6. The brake 302 or a flywheel sits on the workpiece spindle. The two wheel pairs work with backlash so that, during machining, only one side of each tooth engages other teeth. The backlashes, however, are adjusted to one another in such a manner that both wheel pairs run together without backlash. In other words, for example, if on one wheel the right flank of each tooth engages other teeth, then on the other wheel of the same spindle the left flank of each tooth engages other teeth. For changing the tooth flanks being machined, the shifting coupling 320 is opened for a short period of time and the direction of rotation of the motor is changed, or alternatively a not-illustrated reversing gear mechanism is actuated. The brake or the flywheel then takes care of the engagement of the desired tooth flanks.

As in the preceding example, the cross-axes angle and thus the pitch angle of the workpiece teeth with respect to the tool is adjusted during moving apart of the tool and workpiece when enlarging the center distance 317. For this, the feed (removal) movement is controlled by the CNC-control 319, which correspondingly controls the swivel motor 312.

The control devices 319, 322 to 325 are well known in the art. They can be digital or analog. Instead of electrical, hydraulic or pneumatic devices, it is also possible to use mechanical devices, for example a link mechanism.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for the precision working of a tooth system of a rotary supported gearlike workpiece by rolling the teeth of said gearlike workpiece with teeth on a rotatably supported gearlike tool, said workpiece and said tool being capable of movement toward and away from each other so as to effect a change in the center distance therebetween and incapable of an axial movement during said precision working, the axes of rotation of said workpiece and said tool being spaced along a common normal and crossed, said tool having an abrasive surface means thereon formed hyperboloidally in the axial dimension so that when said workpiece and said tool are engaged, at least one of said teeth of said tool is engaged with normal backlash by at least one of said teeth on said workpiece over the entire axial length thereof by the tool teeth, backlash control means being provided for adjusting and maintaining the relative positions between the teeth on said workpiece/tool so that the operatively engaged combination of said workpiece/tool is entirely backlash free, the improvement comprising a controllable first-adjusting means for changing the center distance between said axes of rotation of said workpiece and said tool and a controllable second adjusting means for adjusting a crossed axes angle between said axes of rotation of said workpiece and said tool, and control means for simultaneously interdependently controlling said first and second adjusting means to effect an enlarging of the center distance and a corresponding change of the cross axes angle to the enlarging center distance in consideration of a pitch angle of the workpiece teeth, so that during the entire interval that said center distance is enlarged and said teeth on said workpiece are engaged by said teeth on said tool over the entire axial length of each of said tool teeth, a removal of any grooves and other imperfections in the surface of said teeth on said workpiece caused by imperfections on said teeth of said tool will occur.

2. The apparatus according to claim 1, wherein said backlash control means includes at least a pair of toothed guide wheels, said tool and said workpiece being each operatively coupled to, sand in a manner fixed against relative rotation with respect to, a respective toothed guide wheel, said guide wheels being in toothed engagement with one another and having the same translation ratio therebetween as between said tool and said workpiece.

3. In the apparatus according to claim 1, wherein said control means includes a CNC-control.

4. In a method for the precision working of a tooth system of a rotatably supported gearlike workpiece by rolling the teeth of said gearlike workpiece with teeth on a rotatably supported gearlike tool, said workpiece and said tool being capable of movement toward and away from each other so as to effect a change in the center distance therebetween and incapable of an axial movement during said precision working, the axes of rotation of said workpiece and said tool being spaced along a common normal and crossed, said tool having an abrasive surface means thereon formed hyperboloidally in the axial dimension so that when said workpiece and said tool are engaged, at least one of said teeth of said tool is engaged with normal backlash by at least one of said teeth on said workpiece over the entire axial length of the tool tooth, backlash control means being provided for adjusting and maintaining the relative positions between the teeth on said workpiece/tool so hat the operatively engaged combination of said workpiece/tool is entirely backlash free, the improvement comprising the step of adjusting, while simultaneously enlarging the center distance between said workpiece and said tool during said precision working, the cross-axes angle to correspond to the center distance in consideration of a pitch angle of the workpiece teeth, so that during the entire interval that said center distance is enlarged and said teeth on said workpiece are engaged by said teeth on said tool over the entire axial length of each of said tool teeth, a removal of any grooves and other imperfections in the surface of said teeth on said workpiece caused by imperfections on said teeth of said tool will occur.

* * * * *